(12) United States Patent
Bovington et al.

(10) Patent No.: US 11,923,906 B2
(45) Date of Patent: Mar. 5, 2024

(54) LASERLESS OPTICAL TRANSCEIVER

(71) Applicant: Cisco Technology, Inc., San Jose, CA (US)

(72) Inventors: Jock T. Bovington, La Mesa, CA (US); Mark C. Nowell, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 33 days.

(21) Appl. No.: 17/814,415

(22) Filed: Jul. 22, 2022

(65) Prior Publication Data

US 2024/0031028 A1 Jan. 25, 2024

(51) Int. Cl.

| H04B 10/00 | (2013.01) |
|---|---|
| G02B 6/42 | (2006.01) |
| H04B 10/2507 | (2013.01) |
| H04B 10/40 | (2013.01) |
| H04B 10/532 | (2013.01) |
| H04J 14/02 | (2006.01) |
| H04J 14/00 | (2006.01) |

(52) U.S. Cl.
CPC ........... H04B 10/40 (2013.01); G02B 6/4246 (2013.01); H04B 10/2572 (2013.01); H04B 10/532 (2013.01); H04J 14/02 (2013.01)

(58) Field of Classification Search
CPC ................. H04B 10/2587; H04B 10/2589
See application file for complete search history.

(56) References Cited

U.S. PATENT DOCUMENTS

| 10,761,263 | B1 | 9/2020 | Barbarossa et al. | |
|---|---|---|---|---|
| 2005/0286903 | A1 | 12/2005 | Jennen et al. | |
| 2012/0134676 | A1 | 5/2012 | Kikuchi | |
| 2016/0337041 | A1* | 11/2016 | Wen | H04B 10/2575 |
| 2018/0269966 | A1* | 9/2018 | Stark | H04B 10/2587 |
| 2021/0184774 | A1 | 6/2021 | Zhou et al. | |

* cited by examiner

Primary Examiner — Daniel G Dobson
(74) Attorney, Agent, or Firm — Patterson + Sheridan, LLP (57) ABSTRACT

A system includes a first device and a second device. The first device generates a source optical signal using a first optical signal and a polarization splitter-rotator. The second device modulates the source optical signal from the first device using a first data signal to produce a first modulated optical signal. The first modulated optical signal has a polarization that is orthogonal to a polarization of the source optical signal. The first device recovers the first data signal from the first modulated optical signal using at least the polarization splitter-rotator.

20 Claims, 9 Drawing Sheets

LASERLESS OPTICAL TRANSCEIVER

TECHNICAL FIELD

Embodiments presented in this disclosure generally relate to optical devices. More specifically, the embodiments relate to laserless optical transceivers.

BACKGROUND

Optical signals (e.g., lasers or lights) may be used to communicate data or other information to optical devices. An optical source (e.g., a laser diode) may be used to source these optical signals. The optical sources, however, also generate or may be sensitive to heat energy, which may be undesirable in certain circuits or designs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a system includes a first device and a second device. The first device generates a source optical signal using a first optical signal and a polarization splitter-rotator. The second device modulates the source optical signal from the first device using a first data signal to produce a first modulated optical signal. The first modulated optical signal has a polarization that is orthogonal to a polarization of the source optical signal. The first device recovers the first data signal from the first modulated optical signal using at least the polarization splitter-rotator.

According to another embodiment, a method includes generating, by a first device, a source optical signal using a first optical signal and a polarization splitter-rotator and modulating, by a second device with an optical connection to the first device, the source optical signal from the first device using a first data signal to produce a first modulated optical signal. The first modulated optical signal has a polarization that is orthogonal to a polarization of the source optical signal. The method also includes recovering, by the first device, the first data signal from the first modulated optical signal using at least the polarization splitter-rotator.

According to another embodiment, a system includes a first single mode fiber, a first device connected to the first single mode fiber, and a second device connected to the first single mode fiber. The first device includes an optical source and a first polarization splitter-rotator. The first polarization splitter-rotator rotates a polarization of the optical signal to produce a source optical signal. The second device includes a signal processor and a reflective modulator. The signal processor generates a first data signal representing data received by the signal processor. The reflective modulator receives the source optical signal over the first single mode fiber, modulates the source optical signal using the first data signal to produce a first modulated optical signal with a polarization that is orthogonal to a polarization of the source optical signal, and communicates the first modulated optical signal to the polarization splitter-rotator over the first single mode fiber.

According to an embodiment, an optical module includes an optical source, a first polarization splitter-rotator, a second polarization splitter-rotator, a first port, a second port, a third port, and a fourth port. The optical source produces an optical signal. The first polarization splitter-rotator generates a first source optical signal based at least in part on the optical signal. The second polarization splitter-rotator generates a second source optical signal based at least in part on the optical signal. The first port transmits, to a first device, the first source optical signal and receives, from the first device, a first modulated optical signal. The first modulated optical signal has a polarization that is orthogonal to a polarization of the first source optical signal. The first polarization splitter-rotator produces a second modulated optical signal based at least in part on the first modulated optical signal. The second port transmits, to a second device, the second source optical signal and receives, from the second device, a third modulated optical signal. The third modulated optical signal has a polarization that is orthogonal to a polarization of the second source optical signal. The second polarization splitter-rotator produces a fourth modulated optical signal based at least in part on the third modulated optical signal. The third port transmits the second modulated optical signal to the second device. The fourth port transmits the fourth modulated optical signal to the first device.

According to another embodiment, a method includes producing, by an optical source, an optical signal and generating, by a first polarization splitter-rotator, a first source optical signal based at least in part on the optical signal. The method also includes generating, by a second polarization splitter-rotator, a second source optical signal based at least in part on the optical signal and transmitting, by a first port and to a first device, the first source optical signal. The method further includes receiving, by the first port and from the first device, a first modulated optical signal. The first modulated optical signal has a polarization that is orthogonal to a polarization of the first source optical signal. The method also includes producing, by the first polarization splitter-rotator, a second modulated optical signal based at least in part on the first modulated optical signal and transmitting, by a second port and to a second device, the second source optical signal. The method further includes receiving, by the second port and from the second device, a third modulated optical signal having a polarization that is orthogonal to a polarization of the second source optical signal and producing, by the second polarization splitter-rotator, a fourth modulated optical signal based at least in part on the third modulated optical signal. The method also includes transmitting, by a third port, the second modulated optical signal to the second device and transmitting, by a fourth port, the fourth modulated optical signal to the first device.

According to another embodiment, a system includes a source device, a receiver device, and a pluggable device attached to the source device. The pluggable devices includes an optical module includes an optical source, a first polarization splitter-rotator, a second polarization splitter-rotator, a first port, a second port, a third port, and a fourth port. The optical source produces an optical signal. The first polarization splitter-rotator generates a first source optical signal based at least in part on the optical signal. The second polarization splitter-rotator generates a second source optical signal based at least in part on the optical signal. The first port transmits, to the receiver device, the first source optical signal and receives, from the receiver device, a first modulated optical signal. The first modulated optical signal has a polarization that is orthogonal to a polarization of the first source optical signal. The first polarization splitter-rotator produces a second modulated optical signal based at least in part on the first modulated optical signal. The second port transmits, to the source device, the second source optical signal and receives, from the source device, a third modulated optical signal. The third modulated optical signal has a polarization that is orthogonal to a polarization of the second source optical signal. The second polarization splitter-rotator produces a fourth modulated optical signal based at least in part on the third modulated optical signal. The third port transmits the second modulated optical signal to the source device. The fourth port transmits the fourth modulated optical signal to the receiver device.

EXAMPLE EMBODIMENTS

The present disclosure describes systems and methods for optical communication that use laserless optical transceivers. Generally, these optical transceivers do not have their own optical sources (e.g., laser diodes). Rather, they use source optical signals from other devices (e.g., other optical devices). For example, these optical transceivers may include a reflective modulator that receives a source optical signal from another optical device. The reflective modulator modulates that source optical signal using a data signal to produce a modulated optical signal. The transceiver then communicates the modulated signal back to the other optical device. The other optical device may include a polarization splitter-rotator and a transimpedance amplifier or a photodiode that allows the data to be recovered from the modulated signal. In this manner, the optical transceiver does not include its own optical source, which reduces heat generation or heat sensitivity within the optical transceiver.

In some embodiments, the optical source may be provided in a pluggable device that connects to multiple devices. The pluggable device may include multiple polarization splitter-rotators that produce source optical signals for the multiple, connected devices. Reflective modulators at the connected devices modulate the source optical signals using data signals to produce modulated optical signals. The connected devices communicate the modulated signals back to the pluggable device. The pluggable device then reflects the modulated signals to other connected devices. In this manner, none of the connected devices may have their own optical sources. Rather, the pluggable device provides the optical source for the connected devices, which reduces the heat generation or heat sensitivity in the connected devices.

Figure 1:
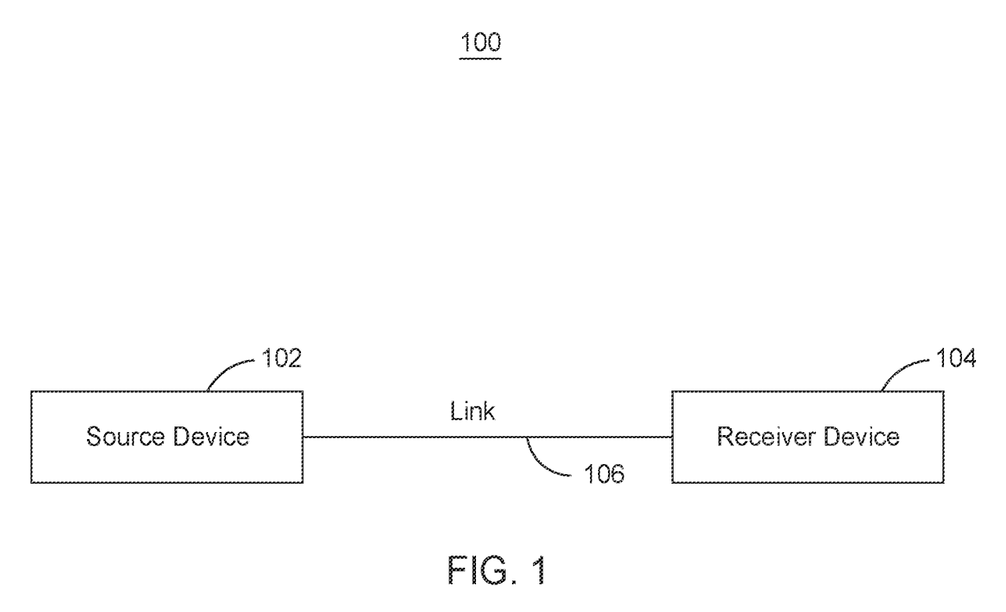
FIG. 1 an example optical system.

FIG. 1 illustrates an example optical system 100. As seen in FIG. 1, the optical system 100 includes a source device 102 and a receiver device 104. Generally, the source device 102 and the receiver device 104 are optical transceivers that transmit and receive optical signals over an optical link 106 that connects the source device 102 and the receiver device 104. The source device 102 and the receiver device 104 may convert received optical signals into electrical signals. The source device 102 and the receiver device 104 may then communicate the electrical signals to other devices, such as computers or servers, for analysis and processing. The source device 102 and receiver device 104 may receive electrical signals and convert those received electrical signals into optical signals. The source device 102 and receiver device 104 may then transmit those optical signals over the link 106 to the other device.

The source device 102 and the receiver device 104 may use a source optical signal (e.g., a laser) to convert an electric signal into an optical signal. For example, the source device 102 or the receiver device 104 may modulate the source optical signal using the electrical signal to convert the electrical signal into the optical signal. The source optical signal may be produced by an optical source (e.g., a laser diode). The optical sources, however, occupy physical space and generate heat, which may interfere with the operations of certain components within the source device 102 or the receiver device 104. In some embodiments, to reduce the amount of generated heat and the amount of space occupied by optical sources in the optical system 100, one or more of the components within the optical system 100 may not include an optical source. For example, the receiver device 104 may not include an optical source. Rather, the receiver device 104 may receive a source optical signal from the source device 102 over the link 106. The source device 102 and the receiver device 104 may include components that operate on the source optical signal so that the source optical signal and a modulated optical signal may be communicated over the link 106.

The link 106 may include one or more optical fibers that communicate optical signals between the source device 102 and the receiver device 104. In some embodiments, the link 106 includes two single mode fibers that communicate optical signals between the source device 102 and the receiver device 104. One of the single mode fibers may be used to communicate a modulated optical signal from the source device 102 to the receiver device 104. The other single mode fiber may be used to communicate the source optical signal from the source device 102 to the receiver device 104 and a modulated optical signal from the receiver device 104 to the source device 102.

The optical system 100 may include any suitable number of source devices 102, receiver devices 104, and links 106. In one embodiment, the optical system 100 includes multiple receiver devices 104. The source device 102 connects to each of the receiver devices 104 using multiple links 106 that connect the source device 102 to the receiver devices 104. The source device 102 may provide a source optical signal to each of the receiver devices 104 over the links 106.

Figure 2:
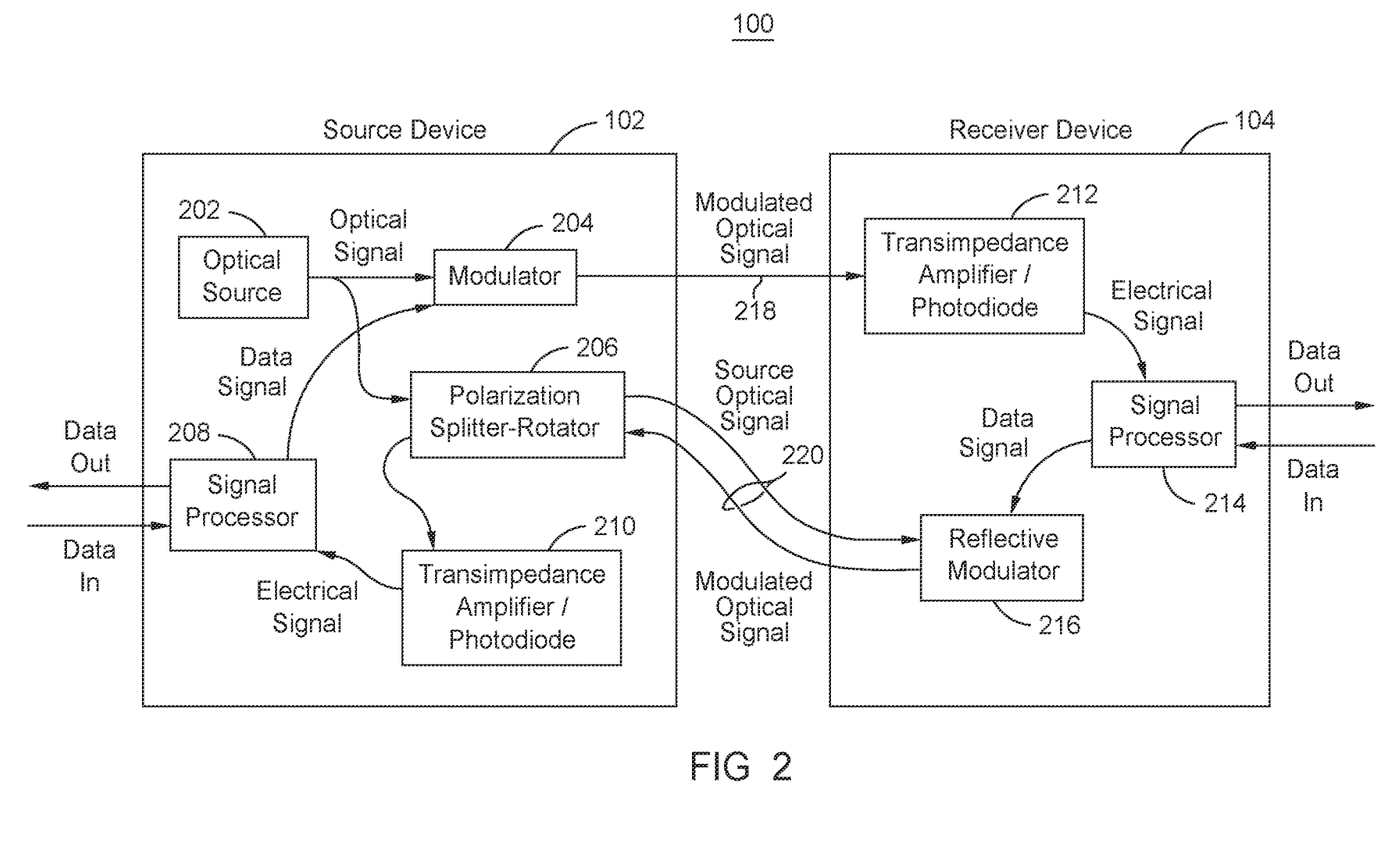
FIG. 2 illustrates example components of the optical system of FIG. 1.

FIG. 2 illustrates example components of the optical system 100 of FIG. 1. As seen in FIG. 2, the optical system 100 includes the source device 102 and the receiver device 104. Generally, the source device 102 and the receiver device 104 are optical transceivers that communicate modulated optical signals to each other. Additionally, the source device 102 provides a source optical signal to the receiver device 104. The source device 102 and the receiver device 104 include components that allow the source optical signal to be communicated over the same fiber as a modulated optical signal.

The source device 102 communicates a modulated optical signal to the receiver device 104 and a source optical signal to the receiver device 104. As seen in FIG. 2, the source device 102 includes an optical source 202, a modulator 204, a polarization splitter-rotator 206, a signal processor 208, and a transimpedance amplifier or photodiode 210. These components operate together to communicate a modulated optical signal to the receiver device 104 over a first optical fiber 218 and a source optical signal to the receiver device 104 over a second optical fiber 220. Each of these optical fibers 218 and 220 may be single mode fibers. In certain embodiments, using single mode fibers simplifies the optical coupling and reduces costs relative to using multimode fibers.

The optical source 202 is a component that emits an optical signal. For example, the optical source 202 may be a laser diode that emits a laser. The laser may be used by the source device 102 to produce a source optical signal for the receiver device 104. The optical source 202 may be disposed within the source device 102. In some embodiments, the optical source 202 may be disposed in another device rather than the source device 102 and the receiver device 104. The optical source 202 may emit an optical signal that is directed to the source device 102. The source device 102 may use the optical signal to produce a source optical signal for the receiver device 104. As seen in FIG. 2, the optical source 202 emits an optical signal that is directed to the modulator 204 and the polarization splitter-rotator 206.

The modulator 204 modulates the optical signal from the optical source 202 using a data signal from the signal processor 208 to produce a modulated optical signal. The signal processor 208 may have received the data used to form the data signal from an external source (e.g., a computer or server). In some embodiments, the modulator 204 is a PAM4 modulator that performs PAM4 encoding on the optical signal from the optical source 202 using the data signal. The data signal is an electric signal that represents data from the signal processor 208. The modulator 204 effectively encodes the electric data signal into the optical signal from the optical source 202 to produce the modulated optical signal. As a result, the modulated optical signal is an optical signal that effectively includes information from the data signal. The modulator 204 directs the modulated optical signal to the receiver device 104 over the optical fiber 218 of the optical link between the source device 102 and the receiver device 104. In some embodiments, the optical fiber 218 is a single mode fiber.

The polarization splitter-rotator 206 rotates the polarization of incoming optical signals and then combines or splits the optical signals. As seen in FIG. 2, the polarization splitter-rotator 206 receives the optical signal from the optical source 202. The polarization splitter-rotator 206 rotates the polarization of the optical signal to produce a source optical signal. The polarization splitter-rotator 206 then directs the source optical signal to the receiver device 104 over the optical fiber 220 of the optical link between the source device 102 and the receiver device 104.

The polarization splitter-rotator 206 also receives a modulated optical signal from the receiver device 104 over the same optical fiber 220 that is used to communicate the source optical signal from the source device 102 to the receiver device 104. The modulated optical signal from the receiver device 104 may have a polarization that is orthogonal to the polarization of the source optical signal from the source device 102. As a result, the source optical signal and the modulated optical signal may be communicated over the same fiber 220. The polarization splitter-rotator 206 receives the modulated optical signal from the receiver device 104 and rotates the polarization of the modulated optical signal. After rotating the polarization of the modulated optical signal, the polarization splitter-rotator 206 directs the modulated optical signal to the transimpedance amplifier or photodiode 210.

The polarization splitter-rotator 206, as shown herein, may include any suitable components that rotate the polarization of optical signals and then combines or splits the optical signals. For example, the polarization splitter-rotator 206 may include polarization splitter grading couplers, polarization beam splitters with a quarter wave plate, or integrated photonics that perform the same function.

The transimpedance amplifier or photodiode 210 detects the modulated optical signal from the polarization splitter-rotator 206 and converts the modulated optical signal into an electrical signal. Specifically, the transimpedance amplifier or the photodiode 210 may detect the modulated optical signal and produce an electrical signal representing the modulated optical signal. The transimpedance amplifier or the photodiode 210 directs the electrical signal to the signal processor 208. The signal processor 208 processes the electrical signal to determine data encoded within the electrical signal. The signal processor 208 may then communicate that data to another device (e.g., a computer or a server).

The receiver device 104 includes a transimpedance amplifier or photodiode 212 that receives the modulated optical signal from the source device 102 over the fiber 218. The transimpedance amplifier or photodiode 212 converts the modulated optical signal into an electrical signal. For example, the transimpedance amplifier or the photodiode 212 may detect the modulated optical signal and produce an electrical signal representing the modulated optical signal. The transimpedance amplifier or photodiode 212 communicate the electrical signal to a signal processor 214 in the receiver device 104. The signal processor 214 processes the electrical signal to determine data encoded within the electrical signal. The signal processor 214 then communicates that data to another device (e.g., a computer or a server).

The signal processor 214 may receive data from the other device. The data may be in response to the data that the signal processor 214 communicated to that device. The signal processor 214 may process that data and encode that data within a data signal. The data signal may be another electrical signal. The signal processor 214 communicates that data signal to a reflective modulator 216 in the receiver device 104.

The reflective modulator 216 receives the data signal from the signal processor 214 and the source optical signal from the source device 102. The reflective modulator 216 modulates the source optical signal using the data signal to produce a modulated optical signal. In certain embodiments, the reflective modulator 216 modulates the source optical signal in such a manner that the modulated optical signal has a polarization that is orthogonal to the polarization of the source optical signal. For example, the reflective modulator 216 may modulate the source optical signal using the data signal to produce the modulated optical signal with a polarization that is 90 degrees rotated from the polarization of the source optical signal. Because the polarization of the source optical signal is orthogonal to the polarization of the modulated optical signal, the source optical signal and the modulated optical signal may be communicated over the same fiber 220, which may be a single mode fiber. The reflective modulator 216 directs the modulated optical signal to the source device 102 over the same fiber 220 that directed the source optical signal to the reflective modulator 216. In this manner, the receiver device 104 modulates the source optical signal from the source device 102 and communicates the modulated optical signals over the same fiber 220 that provided the source optical signal. As a result, the receiver device 104 does not include a separate optical source that provides a source optical signal, which reduces the heat generation of the receiver device 104, in certain embodiments.

The reflective modulators described herein may be any suitable reflective modulator. For example, the reflective modulators may be Faraday-rotator-based reflective modulators, polarization-splitter-rotator-based reflective modulators, reflective modulators with bulk polarization beam splitters with polarization rotation, or vertically coupled reflective modulators.

The signal processors 208 and 214 may be any electronic circuitry, including, but not limited to one or a combination of microprocessors, microcontrollers, application specific integrated circuits (ASIC), application specific instruction set processor (ASIP), and/or state machines, that execute software or firmware to control the operation of the source device 102 and the receiver device 104. The signal processors 208 and 214 may be 8-bit, 16-bit, 32-bit, 64-bit or of any other suitable architecture. The signal processors 208 and 214 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The signal processors 208 and 214 may include other hardware that operates software to control and process information. The signal processors 208 and 214 control the operation and administration of the source device 102 and receiver device 104 by processing information (e.g., information received from the source device 102 and the receiver device 104). The signal processors 208 and 214 are not limited to single processing devices and may encompass multiple processing devices.

Figure 3:
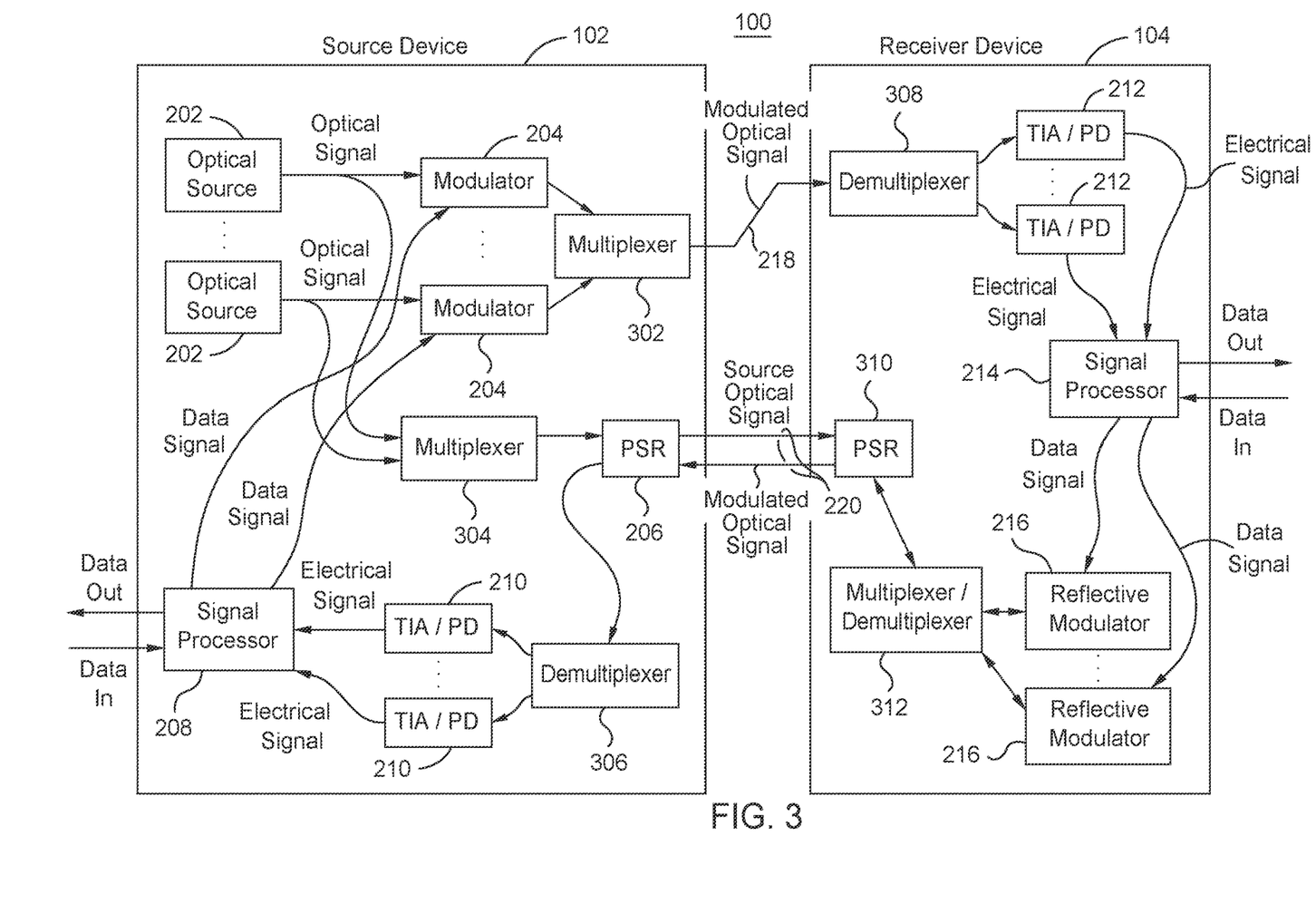
FIG. 3 illustrates example components of the optical system of FIG. 1.

FIG. 3 illustrates example components of the optical system 100 of FIG. 1. Generally, the example of FIG. 3 shows the source device 102 using multiple optical sources 202 to produce multiple optical signals that are modulated using multiple data signals. The source device 102 and the receiver device 104 are optical transceivers that may include multiplexers and de-multiplexers that combine and separate these multiple optical signals or modulated optical signals.

The source device 102 includes multiple optical sources 202. Each of the optical sources 202 may be a laser diode that produces or emits an optical signal. For example, each optical source 202 may emit an optical signal with a different wavelength. These optical signals may then be modulated using multiple data signals.

The source device 102 includes multiple modulators 204 that modulate different optical signals from the optical sources 202 using data signals from the signal processor 208. The signal processor 208 may have received data from an external device (e.g., a computer or server). The signal processor 208 may process this data and encode the data into the data signals. The data signals may then be provided to the modulators 204 for modulation. Each modulator 204 may receive a different data signal from the signal processor 208 for modulation. Additionally, each modulator 204 may receive an optical signal from a different optical source 202. As a result, in some embodiments, each modulator 204 may receive an optical signal with a different wavelength. The modulators 204 modulate the optical signals from the optical sources 202 using the data signals to produce multiple modulated optical signals.

The modulators 204 direct the modulated optical signals to a multiplexer 302. The multiplexer 302 may perform wavelength division multiplexing to combine the modulated optical signals from the modulators 204 into a single-beam. The multiplexer 302 then communicates the single-beam modulated optical signal to the receiver device 104 over a fiber 218 of the optical link between the source device 102 and the receiver device 104. This fiber 218 may be a single mode fiber.

The source device 102 includes a multiplexer 304 that receives the optical signals from the optical sources 202. In certain embodiments, the multiplexer 304 performs wavelength division multiplexing on the optical signals from the optical sources 202 to combine the optical signals into a single beam. The multiplexer 304 directs the single beam to the polarization splitter-rotator 206. As discussed previously, the polarization splitter-rotator 206 rotates the polarization of the beam to produce a source optical signal and communicates the source optical signal to the receiver device 104 over the fiber 220.

The polarization splitter-rotator 206 receives a modulated optical signal from the receiver device 104. As discussed previously, the modulated optical signal may have a polarization that is orthogonal to the polarization of the source optical signal. As a result, the source optical signal and the modulated optical signal may be communicated between the source device 102 and the receiver device 104 over the same fiber 220. The polarization splitter-rotator 206 rotates the polarization of the modulated optical signal and then directs the modulated optical signal to a de-multiplexer 306 of the source device 102. In certain embodiments, the de-multiplexer 306 de-multiplexes the modulated optical signal to split the modulated optical signal into multiple modulated optical signals. The source device 102 includes multiple transimpedance amplifiers or photodiodes 210 that convert the multiple modulated optical signals from the de-multiplexer 306 into multiple electrical signals. The transimpedance amplifiers or photodiodes 210 direct the electrical signals to the signal processor 208. The signal processor 208 processes these electrical signals to extract data encoded within these electrical signals. The signal processor 208 then communicates that data out to external devices (e.g., computers or servers).

The receiver device 104 also includes multiplexers and de-multiplexers, that allow the receiver device 104 to handle multiple optical signals generated from different optical signals. The receiver device 104 includes a de-multiplexer 308 that receives the modulated optical signal from the source device 102 over the fiber 218. As discussed previously, the modulated optical signal may have been produced by combining multiple modulated optical signals at the multiplexer 302 of the source device 102. The de-multiplexer 308 de-multiplexes the modulated optical signal to split the single-beam modulated optical signal into the multiple modulated optical signals that were combined at the multiplexer 302. The de-multiplexer 308 directs the multiple modulated optical signals to multiple transimpedance amplifiers or photodiodes 212 in the receiver device 104. The transimpedance amplifiers or photodiodes 212 convert the multiple modulated optical signals into multiple electrical signals. The transimpedance amplifiers or photodiodes 212 direct the multiple electrical signals to the signal processor 214. The signal processor 214 processes the electrical signals and extracts data encoded within the electrical signals. The signal processor 214 then communicates the data to external devices such as computers or servers.

The signal processor 214 may receive data from the external devices. The signal processor 214 processes the received data and encodes the data into multiple data signals. The signals processor 214 then directs the multiple data signals to multiple reflective modulators 216 in the receiver device 104.

As discussed previously, the reflective modulators 216 modulate the source optical signals received from the source device 102 using the data signals received from the signal processor 214 such that the resultant modulated optical signals have a polarization that is orthogonal to the polarization of the source optical signals used to produce the modulated optical signals. In the example of FIG. 3, the receiver device 104 includes a polarization splitter-rotator 310 that receives the single-beam source optical signal from the source device 102. The polarization splitter-rotator 310 rotates the polarization of the single beam source optical signal. In some embodiments, the polarization splitter-rotator 310 rotates the polarization of the single beam source optical signal to reverse the polarization rotation performed by the polarization splitter-rotator 206 of the source device 102. After rotating the polarization of the single beam source optical signal from the source device 102, the polarization splitter-rotator 310 directs the source optical signal to a multiplexer de-multiplexer 312. The multiplexer de-multiplexer 312 de-multiplexes the source optical signal to produce multiple source optical signals. In some embodiments, the multiplexer de-multiplexer 312 performs wavelength division multiplexing to split the single-beam source optical signal into multiple source optical signals of different wavelengths. The multiplexer de-multiplexer 312 then directs the multiple source optical signals to the multiple reflective modulators 216.

Each reflective modulator 216 then modulates a source optical signal with a different wavelength using their respective data signals to produce a modulated optical signal. The reflective modulators 216 communicate their respective modulated optical signals to the multiplexer de-multiplexer 312. The multiplexer de-multiplexer 312 then performs wavelength division multiplexing on the multiple modulated optical signals to combine the multiple modulated optical signals into a single beam. The multiplexer de-multiplexer 312 then directs the single-beam modulated optical signal to the polarization splitter-rotator 310. The polarization splitter-rotator 310 rotates the polarization of the single-beam modulated optical signal and communicates the single-beam modulated optical signal back to the source device 102 over the fiber 220. As discussed previously, the polarization of the single-beam modulated optical signal may be orthogonal to the polarization of the single-beam source optical signal. As a result, the single-beam source optical signal and the single-beam modulated optical signal may be communicated between the source device 102 and the receiver device 104 using the same optical fiber 220, which may be a single mode fiber. The source device 102 may split the single-beam modulated optical signal and convert the multiple modulated optical signals into electrical signals for processing.

Figure 4:
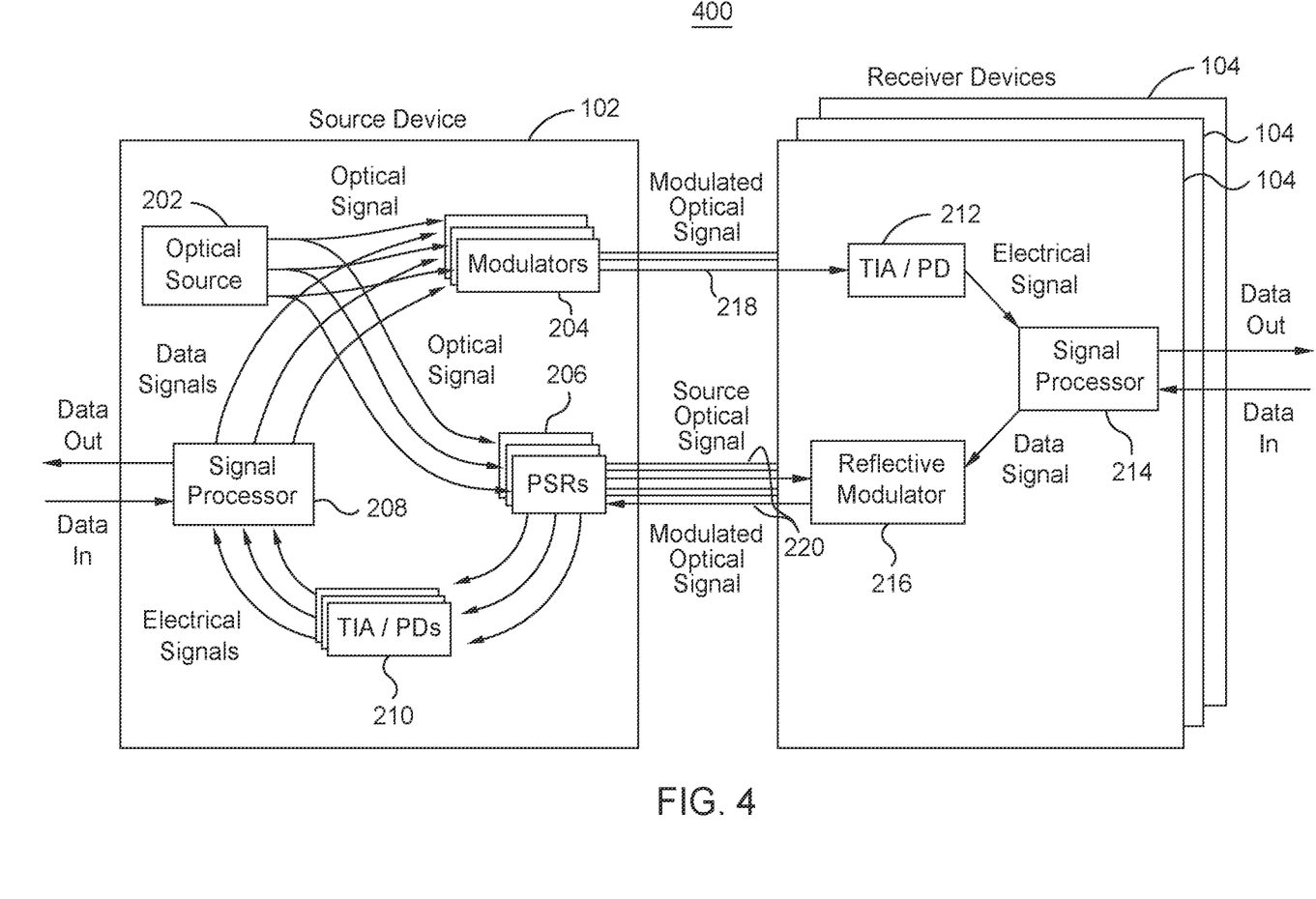
FIG. 4 illustrates an example optical system.

FIG. 4 illustrates an example optical system 400. As seen in FIG. 4, the optical system 400 includes a source device 102 and multiple receiver devices 104. Generally, the source device 102 includes multiple modulators 204, multiple polarization splitter-rotators 206, and multiple transimpedance amplifiers or photodiodes 210, which operate to produce source optical signals and modulated optical signals for the multiple receiver devices 104. The source device 102 may include a modulator 204 for each receiver device 104, a polarization splitter-rotator 206 for each receiver device 104, and a transimpedance amplifier or photodiode 210 for each receiver device 104.

The optical source 202 provides an optical signal to each of the modulators 204. Additionally, the signal processor 208 provides a data signal to each of the modulators 204. Although the optical signals provided to the modulators 204 may be the same, the data signals provided by the signal processor 208 to each of the modulators 204 may not be the same, as each data signal may be intended for a different receiver device 104. The modulators 204 modulate the optical signal from the optical source 202 using the data signals from the signal processor 208 to produce modulated optical signals. Each modulator 204 communicates their respective modulated optical signal to a different receiver device 104. For clarity, communication between the source device 102 and only one receiver device 104 is shown in FIG. 4.

The source device 102 also includes a polarization splitter-rotator 206 for each receiver device 104. Each polarization splitter-rotator 206 receives an optical signal from the optical source 202. Each polarization splitter-rotator 206 rotates the polarization of the optical signal to produce a source optical signal. Each polarization splitter-rotator 206 then directs their respective source optical signal to a different receiver device 104.

Each receiver device 104 includes a transimpedance amplifier or photodiode 212 that receives the modulated optical signal from the source device 102. The transimpedance amplifier or photodiode 212 converts the modulated optical signal into an electrical signal, which is then processed by the signal processor 214. The signal processor 214 may extract data encoded within the electrical signal and communicate that data to a computer or server. The signal processor 214 may receive data from the computer or server and encode that data into a data signal.

Each receiver device 104 includes a reflective modulator 216 that receives a source optical signal from the source device 102 and a data signal from the respective signal processor 214 of the receiver device 104. The reflective modulator 216 modulates the source optical signal from the source device 102 using the data signal to produce a modulated optical signal. The reflective modulator 216 modulates the optical signal in such a manner that the modulated optical signal has a polarization that is orthogonal to the polarization of the source optical signal. For example, the polarization of the modulated optical signal may be different from the polarization of the source optical signal by 90 degrees. Because the polarization of the modulated optical signal is orthogonal to the polarization of the source optical signal, the reflective modulator 216 may communicate the modulated optical signal back to the source device 102 over the same fiber 220 that was used for the source optical signal.

Each polarization splitter-rotator 206 in the source device 102 may receive a modulated optical signal from a different receiver device 104. The polarization splitter-rotators 206 rotate the polarization of the received modulated optical signals and communicate those modulated optical signals to the transimpedance amplifiers or photodiodes 210. Each transimpedance amplifier or photodiode 210 converts a modulated optical signal into an electrical signal. The transimpedance amplifiers or photodiodes 210 communicate the electrical signals to the signal processor 208. The signal processor 208 processes the electrical signals to extract data encoded within the electrical signals. The signal processor 208 then communicates that data to external computers or servers.

Figure 5:
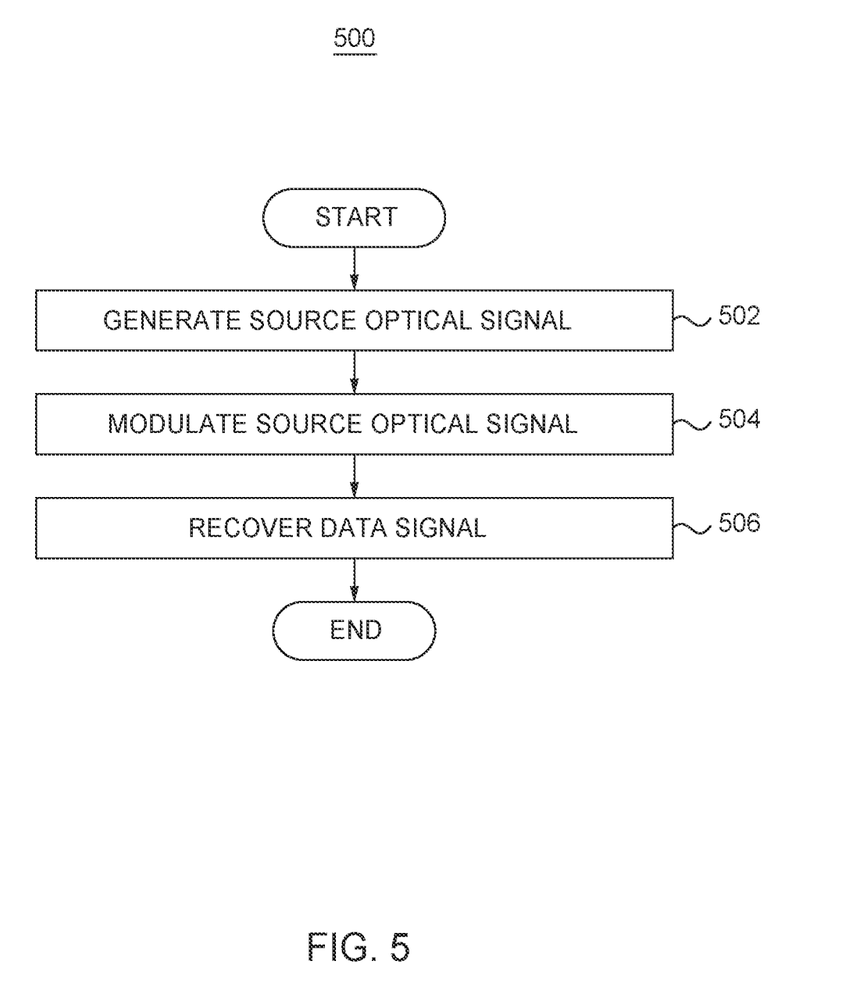
FIG. 5 is a flowchart of an example method performed in the optical systems of FIGS. 1 and 4.

FIG. 5 is a flowchart of an example method 500 performed in the optical systems 100 or 400 of FIGS. 1 and 4. In certain embodiments, the source device 102 and the receiver device 104 perform the steps of the method 500. By performing the method 500, the source device 102 provides a source optical signal for the receiver device 104, such that the receiver device 104 may not include a separate optical source.

In step 502, the source device 102 generates a source optical signal. The source device 102 includes an optical source 202 (e.g., a laser diode) that emits an optical signal. The source device 102 includes a polarization splitter-rotator 206 that receive the optical signal from the optical source 202. The polarization splitter-rotator 206 rotates the polarization of the optical signal to produce the source optical signal. The polarization splitter-rotator 206 then communicates the source optical signal to the receiver device 104 over an optical fiber 220 of the optical link 106 between the source device 102 and the receiver device 104. In some embodiments, the optical fiber 220 is a single mode fiber.

In step 504, the receiver device 104 modulates the source optical signal provided by the source device 102 using a data signal. The receiver device 104 includes the reflective modulator 216 that modulates the source optical signal from the source device 102 using the data signal from the signal processor 214. In some embodiments, the reflective modulator 216 modulates the optical signal in such a manner that the resultant modulated optical signal has a polarization that is orthogonal to the polarization of the source optical signal from the source device 102. For example, the polarization of the modulated optical signal may be different from the polarization of the source optical signal by 90 degrees. As discussed previously, because the polarization of the modulated optical signal is orthogonal to the polarization of the source optical signal, the receiver device 104 may communicate the modulated optical signal back to the source device 102 using the same fiber 220 that was used to communicate the source optical signal from the source device 102 to the receiver device 104. The reflective modulator 216 communicates the modulated optical signal back to the source device 102 using this optical fiber 220, which may be a single mode fiber.

In step 506, the source device 102 recovers the data signal from the modulated optical signal. The polarization splitter-rotator 206 receives the modulated optical signal from the receiver device 104 and rotates the polarization of the modulated optical signal. The polarization splitter-rotator 206 then communicates the modulated optical signal to the transimpedance amplifier or photodiode 210. The transimpedance amplifier or photodiode 210 converts the modulated optical signal into an electrical signal. The transimpedance amplifier or photodiode 210 then communicates the electrical signal to the signal processor 208 in the source device 102. The signal processor 208 processes the electrical signal to extract the data encoded within the electrical signal and communicates that data to an external computer or server.

In some embodiments, the source optical signal for the optical system is provided by a pluggable device. The pluggable device includes an optical source that produces optical signals. The pluggable device may include other components (e.g., polarization splitter-rotators, isolators, and lenses) that use the optical signals from the optical source to produce source optical signals. The pluggable device directs the source optical signals to the devices in the optical system (e.g., the source device and the receiver device). Additionally, the pluggable device may receive modulated optical signals from the source device and the receiver device. The pluggable device may direct the modulated optical signals to the receiver device and the source device. In this manner, the pluggable device provides source optical signals to the source device and the receiver device, and relays modulated optical signals between the source device and the receiver device.

The pluggable device may also form a physical connection with the source device, in addition to an optical connection. For example, the pluggable device may plug into the source device and be held in place by physical connectors (e.g., latches or tabs).

Figure 6:
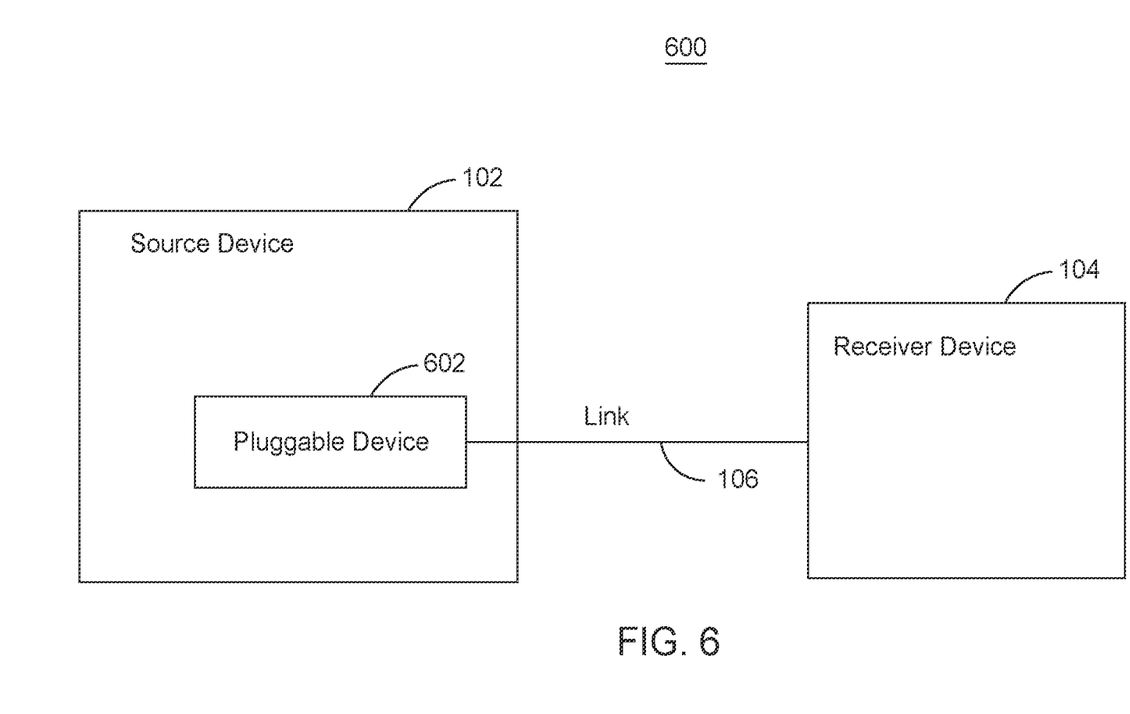
FIG. 6 illustrates an example optical system.

FIG. 6 illustrates an example optical system 600. As seen in FIG. 6, the optical system 600 includes the source device 102 and the receiver device 104, which may be optical transceivers. An optical link 106 connects the source device 102 and the receiver device 104. The optical system 600 also includes a pluggable device 602 that is plugged into the source device 102. The pluggable device 602 may produce source optical signals for the source device 102 and the receiver device 104. The source device 102 and the receiver device 104 may use the source optical signals to produce modulated optical signals. The pluggable device 602 relays the modulated optical signals between the source device 102 and the receiver device 104.

The pluggable device 602 may interface with the receiver device 104 through the optical link 106. For example, the pluggable device 602 may provide a source optical signal to the receiver device 104 through the optical link 106. Additionally, the pluggable device 602 may transmit modulated optical signals to the receiver device 104 and receive modulated optical signals from the receiver device 104 over the optical link 106. In some embodiments, the optical link 106 may include two single mode fibers. The pluggable device 602 may transmit modulated optical signals to the receiver device 104 over one of the single mode fibers, and the pluggable device 602 may transmit a source optical signal to the receiver device 104 over the other single mode fiber. Additionally, the pluggable device 602 may receive modulated optical signals from the receiver device 104 over the same single mode fiber used to transmit the source optical signal to the receiver device 104. The received modulated optical signal may have a polarization that is orthogonal to the polarization of the source optical signal.

Figure 7:
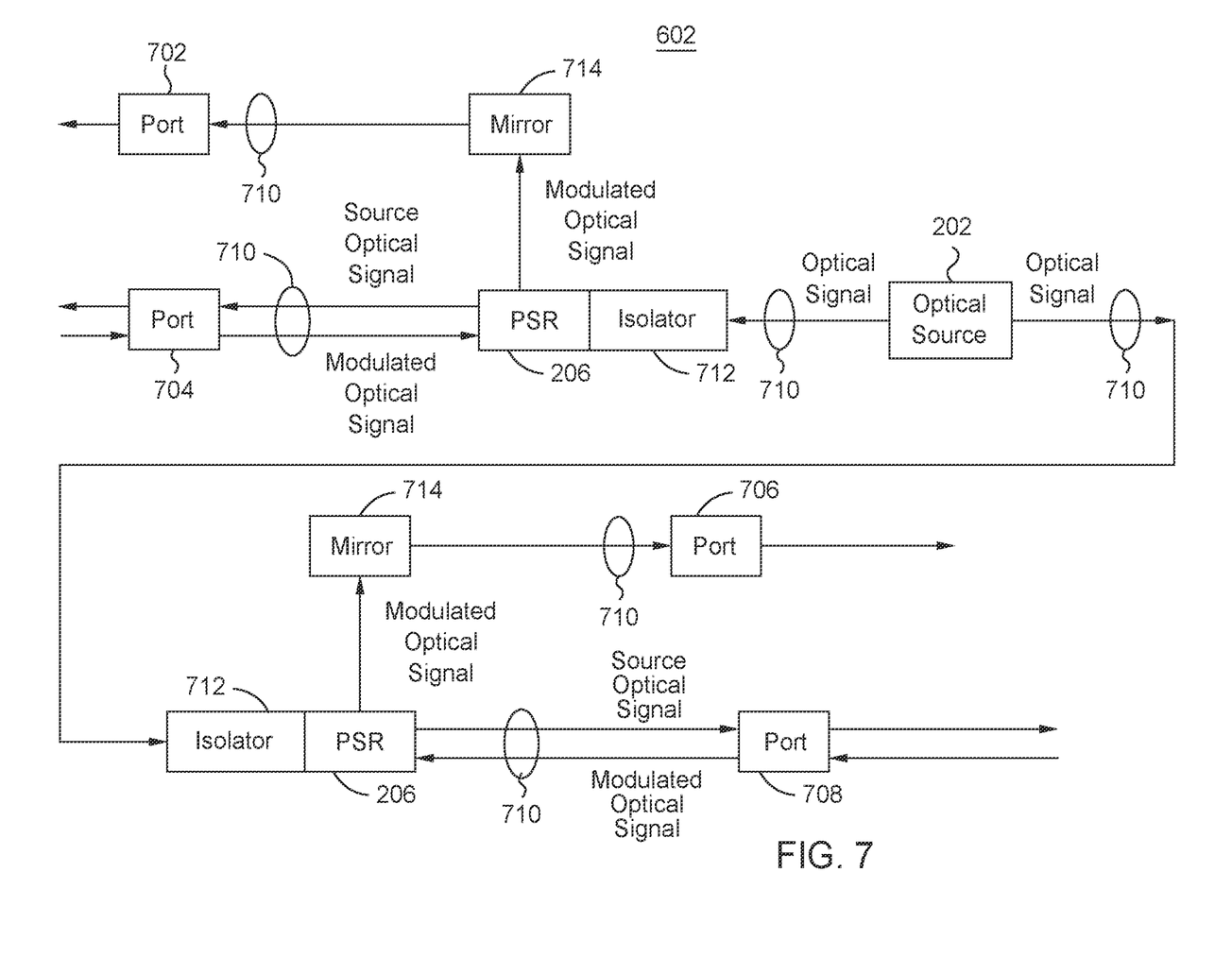
FIG. 7 illustrates an example pluggable device in the optical system of FIG. 6.

FIG. 7 illustrates an example pluggable device 602 in the optical system 600 of FIG. 6. As discussed previously, the pluggable device 602 may plug into the source device 102 and provide source optical signals to the source device 102 and the receiver device 104 in the optical system 600 of FIG. 6. As seen in FIG. 7, the pluggable device 602 includes an optical source 202 that produces optical signals. The optical source 202 may be a laser diode that emits lasers. The pluggable device 602 includes other components that produce any suitable number of source optical signals from the optical signals emitted by the optical source 202.

In the example of FIG. 7, the pluggable device 602 produces two source optical signals from the optical signals produced by the optical source 202. Each side of the pluggable device 602 includes components that use an optical signal produced by the optical source 202 to produce a source optical signal. As seen in FIG. 7, the pluggable device 602 includes two polarization splitter-rotators 206 that use an optical signal from the optical source 202 to produce a source optical signal. As discussed previously, each polarization splitter-rotator 206 rotates the polarization of the optical signal from the optical source 202 to produce the source optical signal. Each polarization splitter-rotator 206 directs their corresponding source optical signal to a port. In the example of FIG. 7, a polarization splitter-rotator 206 directs its source optical signal to a port 704, and a polarization splitter-rotator 206 directs its source optical signal to a port 708. The port 704 may direct the source optical signal to the source device 102, and the port 708 may direct the source optical signal to the receiver device 104.

In certain embodiments, the pluggable device 602 includes an optical isolator 712 for each polarization splitter-rotator 206. Each optical isolator 712 may receive an optical signal from the optical source 202 and force the optical signal to propagate in a particular direction. For example, each optical isolator 712 may direct an optical signal from the optical source 202 to a polarization splitter-rotator 206 in the pluggable device 602. In some embodiments, Faraday rotators are used instead of optical isolators 712 in the pluggable device 602. The Faraday rotators also force a received optical signal to propagate in a particular direction.

The source device 102 and the receiver device 104 may include reflective modulators that produce a modulated optical signal using a data signal and the source optical signal provided by the pluggable device 602. These reflective modulators may produce modulated optical signals that have a polarization that is orthogonal to the polarization of the source optical signals. As a result, the modulated optical signals may be communicated back to the pluggable device 602 over the same optical fiber that was used to communicate the source optical signals to the source device 102 and the receiver device 104. As seen in FIG. 7, the pluggable device 602 receives modulated optical signals at the ports 704 and 708 that were used to communicate the source optical signals away from the pluggable device 602. These modulated optical signals may be received over the same fibers that were used to communicate the source optical signals away from the pluggable device 602. The ports 704 and 708 direct the modulated optical signals to the polarization splitter-rotators 206. The polarization splitter-rotators 206 rotate the polarization of the modulated optical signals and then direct the modulated optical signals to mirrors 714.

The mirrors 714 reflect the modulated optical signals from the polarization splitter-rotators 206 to other ports 702 and 706 of the pluggable device 602. The port 702 may direct the modulated optical signal to the receiver device 104, and the port 706 may direct the modulated optical signal to the source device 102. In some embodiments, the port 702 interfaces with the receiver device 104 over an optical fiber separate from the optical fiber used to communicate the source optical signal to the receiver device 104. Additionally, the port 706 interfaces with the source device 102 using an optical fiber separate from the optical fiber used to the communicate the source optical signal to the source device 102.

In some embodiments, the pluggable device 602 includes lenses 710 that direct various signals to components within the pluggable device 602. As seen in FIG. 7, the pluggable device 602 includes a lens 710 between the optical source 202 and the isolator 712. Additionally, the pluggable device 602 includes a lens 710 between the port 704 and the polarization splitter-rotator 206. Another lens 710 is included between the port 708 and the polarization splitter-rotator 206. Lenses 710 are also included between the mirror 714 and the port 706 and the mirror 714 and the port 702. Each of the lenses 710 directs the various optical signals in the pluggable device 602 to other components in the pluggable device 602 (e.g., ports 702, 704, 706, and 708, polarization splitter-rotators 206, and isolators 712).

Figure 8:
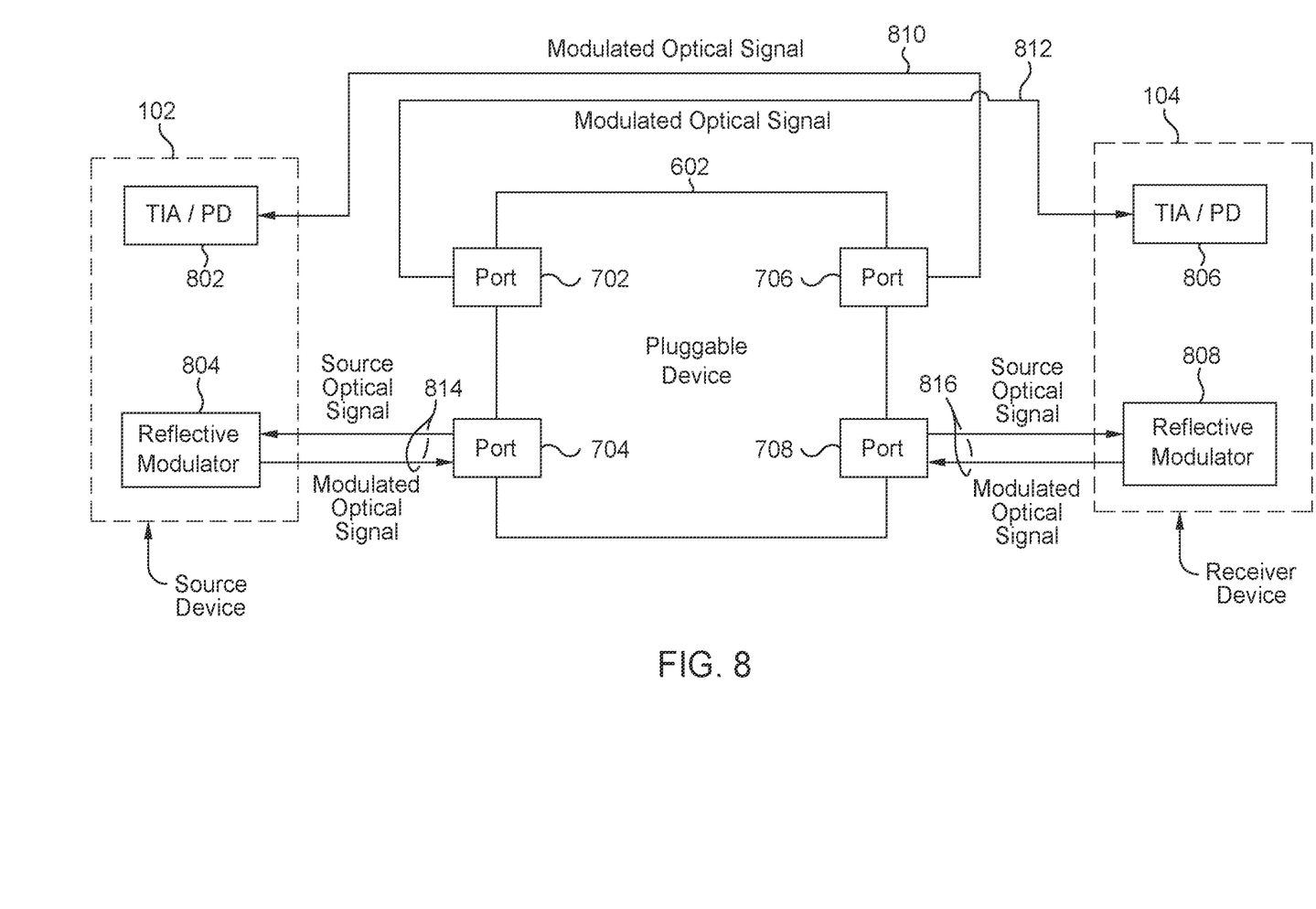
FIG. 8 illustrates example components of the optical system of FIG. 6.

FIG. 8 illustrates example components of the optical system 600 of FIG. 6. As seen in FIG. 8, the pluggable device 602 connects through the ports 702, 704, 706, and 708 to the source device 102 and the receiver device 104. Specifically, the pluggable device 602 connects to the source device 102 through the ports 704 and 706, and the pluggable device 602 connects to the receiver device 104 through the ports 702 and 708. The pluggable device 602 may form other physical connections with the source device 102 (e.g., a pluggable interface of the source device 102).

The source device 102 includes a transimpedance amplifier or photodiode 802 and a reflective modulator 804. The transimpedance amplifier or photodiode 802 receives a modulated optical signal from the port 706 of the pluggable device 602 over a fiber 810, which may be a single mode fiber. As discussed previously, the modulated optical signal may have been communicated to the pluggable device 602 from the receiver device 104 through the port 708. The transimpedance amplifier or photodiode 802 detects the modulated optical signal and converts the modulated optical signal into an electrical signal.

The reflective modulator 804 receives the source optical signal from the port 704 of the pluggable device 602 over the fiber 814. The reflective modulator 804 modulates the source optical signal using a data signal to produce a modulated optical signal. The reflective modulator 804 modulates the optical signal such that the produced modulated optical signal has a polarization that is orthogonal to the polarization of the source optical signal. For example, the modulated optical signal may have a polarization that is different from the polarization of the source optical signal by 90 degrees. Because the modulated optical signal has a polarization that is orthogonal to the polarization of the source optical signal, the modulated optical signal may be communicated over the same optical fiber 814 as the source optical signal. As a result, the reflective modulator 804 may communicate the produced modulated optical signal back to the port 704 over the same fiber 814 that was used to communicate the source optical signal to the reflective modulator 804. The fiber 814 may be a single mode fiber.

The receiver device 104 includes a transimpedance amplifier or photodiode 806 and a reflective modulator 808. The transimpedance amplifier or photodiode 806 receives a modulated optical signal from the port 702 of the pluggable device 602 over the fiber 812, which may be a single mode fiber. The modulated optical signal may have been communicated to the pluggable device 602 from the source device 102 through the port 704. The transimpedance amplifier or photodiode 806 detects the modulated optical signal and converts the modulated optical signal into an electrical signal.

The reflective modulator 808 receives a source optical signal from the port 708 of the pluggable device 602 over the fiber 816. The reflective modulator 808 modulates the source optical signal using a data signal to produce a modulated optical signal. The reflective modulator 808 may modulate the optical signal such that the produced modulated optical signal has a polarization that is orthogonal to the polarization of the source optical signal. For example, the produced modulated optical signal may have a polarization that is different from the polarization of the source optical signal by 90 degrees. Because the polarization of the modulated optical signal is orthogonal to the polarization of the source optical signal, the modulated optical signal may be communicated over the same fiber 816 as the source optical signal. As a result, the reflective modulator 808 may communicate the produced modulated optical signal back to the port 708 using the same fiber 816 that was used to communicate the source optical signal to the receiver device 104.

Figure 9:
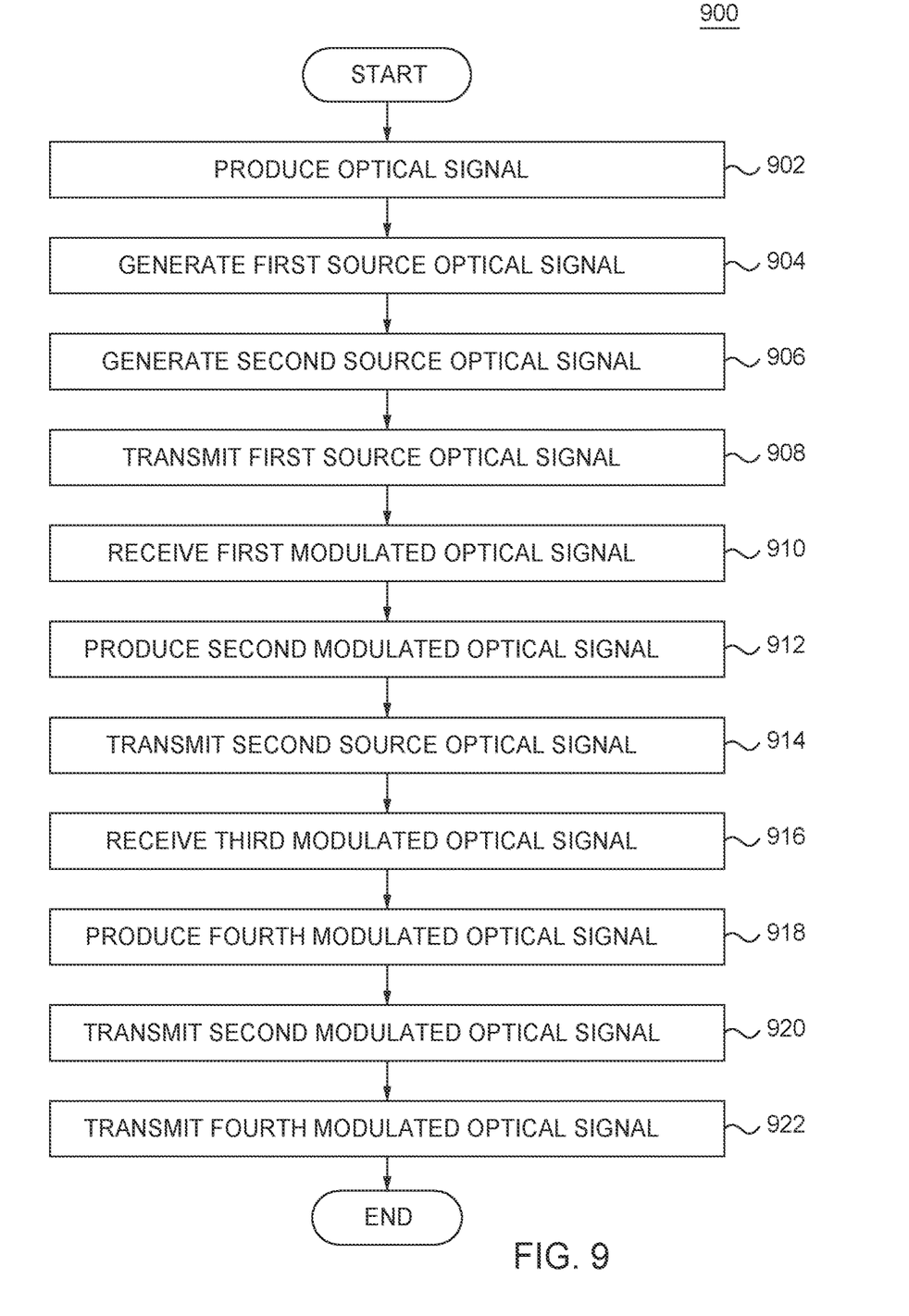
FIG. 9 is a flowchart of an example method performed in the optical system of FIG. 6.

FIG. 9 is a flowchart of an example method 900 performed in the optical system 600 of FIG. 6. Various components of the optical system 600 perform the method 900. In particular embodiments, by performing the method 900, the pluggable device 602 may be used to provide source optical signals to the source device 102 and the receiver device 104.

In step 902, the optical source 202 of the pluggable device 602 produces an optical signal. The optical source 202 may be a laser diode that emits a laser that acts as the optical signal. Other components of the pluggable device 602 may use the optical signal to produce source optical signals for the source device 102 and the receiver device 104.

In step 904, a polarization splitter-rotator 206 generates a first source optical signal using an optical signal from the optical source 202. The polarization splitter-rotator 206 may direct the first source optical signal to a port 704 that interfaces with the source device 102 over a fiber 814. In step 906, another polarization splitter-rotator 206 generates a second source optical signal using an optical signal produced by the optical source 202. This polarization splitter-rotator 206 may direct the source optical signal to the port 708 that interfaces with the receiver device 104 over a fiber 816.

In step 908, the pluggable device 602 transmits the first optical signal to the source device 102 through the port 704. The first source optical signal may be communicated to the source device 102 by the fiber 814, which may be a single mode fiber. The source device 102 includes the reflective modulator 804 that uses a data signal to modulate the source optical signal to produce a first modulated optical signal. The first modulated optical signal may have a polarization that is orthogonal to the polarization of the source optical signal. The source device 102 communicates the first modulated optical signal over the same fiber 814 that was used to communicate the source optical signal to the source device 102 and back to the port 704 of the pluggable device 602. In step 910, the pluggable device 602 receives the first modulated optical signal at the port 704.

In step 912, the pluggable device 602 produces a second modulated optical signal. The first modulated optical signal may be received at a polarization splitter-rotator 206 of the pluggable device 602. This may be the same polarization splitter-rotator 206 that produced the first source optical signal. The polarization splitter-rotator 206 rotates the polarization of the first modulated optical signal to produce the second modulated optical signal. The polarization splitter-rotator 206 then directs the second modulated optical signal to a mirror 714 that reflects the second modulated optical signal to a port 702.

In step 914, the pluggable device 602 transmits the second source optical signal to the receiver device 104. The pluggable device 602 may transmit the second source optical signal through the port 708 to the receiver device 104. The second source optical signal may be communicated to the receiver device 104 over a fiber 816, which may be a single mode fiber. The receiver device 104 includes the reflective modulator 808 that uses a data signal to modulate the second source optical signal and to produce a third modulated optical signal. The third modulated optical signal may have a polarization that is orthogonal to the polarization of the second source optical signal. As a result, the reflective modulator 808 communicates the third modulated optical signal back to the port 708 of the pluggable device 602 over the same fiber 816 used to communicate the second source optical signal to the receiver device 104. In step 916, the pluggable device 602 receives the third modulated optical signal at the port 708.

In step 918, the pluggable device 602 produces a fourth modulated optical signal. The polarization splitter-rotator 206 that produced the second source optical signal may receive the third modulated optical signal and rotate the polarization of the third modulated optical signal to produce the fourth modulated optical signal. The polarization splitter-rotator 206 then directs the fourth modulated optical signal to a mirror 714 that reflects the fourth modulated optical signal to the port 706.

In step 920, the pluggable device 602 transmits the second modulated optical signal to the receiver device 104 using the port 702 and the fiber 812. In step 922, the pluggable device 602 transmits the fourth modulated optical signal to the source device 102 using the port 706 and the fiber 810. In this manner, the pluggable device 602 allows the source device 102 and the receiver device 104 to communicate modulated optical signals to each other.

In summary, an optical system includes a source device 102 and a receiver device 104. The receiver device 104 does not include an optical source. Rather, the source device 102 includes an optical source 202 that provides a source optical signal to the receiver device 104. The receiver device 104 includes a reflective modulator 216 that receives the source optical signal from source device 102. The reflective modulator 216 modulates the source optical signal using a data signal to produce a modulated optical signal. The receiver device 104 communicates the modulated optical signal back to the source device 102. The source device 102 includes a polarization splitter-rotator 206 and a transimpedance amplifier or a photodiode 210 that allow the data to be recovered from the modulated optical signal. In this manner, the receiver device 104 does not include its own optical source, which reduces heat generation within the receiver device 104.

In some embodiments, the optical source 202 may be provided in a pluggable device 602 that connects to the source device 102 and the receiver device 104. The pluggable device 602 may include multiple polarization splitter-rotators 206 that produce source optical signals for the source device 102 and the receiver device 104. Reflective modulators 804 and 808 at the source device 102 and the receiver device 104 modulate the source optical signals using data signals to produce modulated optical signals. The source device 102 and the receiver device 104 communicate the modulated signals back to the pluggable device 602. The pluggable device 602 then reflects the modulated signals to the receiver device 104 or the source device 102. In this manner, the source device 102 and the receiver device 104 may not have their own optical sources 202. Rather, the pluggable device 602 provides the optical source 202 for the source device 102 and the receiver device 104, which reduces the heat generation in the source device 102 and the receiver device 104.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system comprising:
    a first device arranged to generate a source optical signal using a first optical signal and a polarization splitter-rotator; and
    a second device arranged to modulate the source optical signal received from the first device using a first data signal to produce a first modulated optical signal, wherein the first modulated optical signal has a polarization that is orthogonal to a polarization of the source optical signal, and wherein the first device is further arranged to recover the first data signal from the first modulated optical signal using at least the polarization splitter-rotator.

2. The system of claim 1, further comprising a first single mode fiber connected to the first device and the second device, wherein the first device communicates the source optical signal to the second device through the first single mode fiber, and wherein the second device communicates the first modulated optical signal to the first device through the first single mode fiber.

3. The system of claim 2, further comprising a second single mode fiber connected to the first device and the second device, wherein the first device is further arranged to modulate the first optical signal using a second data signal to produce a second modulated optical signal, and wherein the first device communicates the second modulated optical signal to the second device through the second single mode fiber.

4. The system of claim 3, wherein the second device comprises a photodiode arranged to convert the second modulated optical signal to an electrical signal.

5. The system of claim 4, wherein the first data signal is generated based at least in part on the electrical signal.

6. The system of claim 1, wherein the polarization splitter-rotator produces a second modulated optical signal based at least in part on the first modulated optical signal, and wherein the first device comprises a photodiode arranged to convert the second modulated optical signal to an electrical signal.

7. The system of claim 1, wherein the first device is further arranged to further use at least one additional optical signal and a multiplexer to generate the source optical signal.

8. A method comprising:
generating, by a first device, a source optical signal using a first optical signal and a polarization splitter-rotator;
modulating, by a second device with an optical connection to the first device, the source optical signal from the first device using a first data signal to produce a first modulated optical signal, wherein the first modulated optical signal has a polarization that is orthogonal to a polarization of the source optical signal; and
recovering, by the first device, the first data signal from the first modulated optical signal using at least the polarization splitter-rotator.

9. The method of claim 8, wherein the optical connection comprises a first single mode fiber connected to the first device and the second device, wherein the first device communicates the source optical signal to the second device through the first single mode fiber, and wherein the second device communicates the first modulated optical signal to the first device through the first single mode fiber.

10. The method of claim 9, further comprising:
modulating, by the first device, the first optical signal using a second data signal to produce a second modulated optical signal, wherein the optical connection further comprises a second single mode fiber connected to the first device and the second device; and
communicating, by the first device, the second modulated optical signal to the second device through the second single mode fiber.

11. The method of claim 10, further comprising converting, by a photodiode of the second device, the second modulated optical signal to an electrical signal.

12. The method of claim 11, wherein the first data signal is generated based at least in part on the electrical signal.

13. The method of claim 8, further comprising:
producing, by the polarization splitter-rotator, a second modulated optical signal based at least in part on the first modulated optical signal; and
converting, by a photodiode of the first device, the second modulated optical signal to an electrical signal.

14. The method of claim 8, further comprising using, by the first device, at least one additional optical signal and a multiplexer to generate the source optical signal.

15. A system comprising:
a first single mode fiber;
a first device connected to the first single mode fiber, the first device comprising:
an optical source arranged to generate a first optical signal; and
a polarization splitter-rotator arranged to rotate a polarization of the first optical signal to produce a source optical signal; and
a second device connected to the first single mode fiber, the second device comprising:
a signal processor arranged to generate a first data signal representing data received by the signal processor; and
a reflective modulator arranged to:
receive the source optical signal over the first single mode fiber;
modulate the source optical signal using the first data signal to produce a first modulated optical signal with a polarization that is orthogonal to a polarization of the source optical signal; and
communicate the first modulated optical signal to the polarization splitter-rotator over the first single mode fiber.

16. The system of claim 15, further comprising a second single mode fiber connected to the first device and the second device, wherein the first device further comprises a modulator arranged to:
modulate the first optical signal using a second data signal to produce a second modulated optical signal; and
communicate the second modulated optical signal to the second device through the second single mode fiber.

17. The system of claim 16, wherein the second device further comprises a photodiode arranged to convert the second modulated optical signal to an electrical signal.

18. The system of claim 17, wherein the first data signal is generated based at least in part on the electrical signal.

19. The system of claim 15, wherein the polarization splitter-rotator is further arranged to produce a second modulated optical signal based at least in part on the first modulated optical signal, and wherein the first device further comprises a photodiode arranged to convert the second modulated optical signal to an electrical signal.

20. The system of claim 15, wherein the polarization splitter-rotator is further arranged rotate a polarization of the first modulated optical signal.

* * * * *

UNITED STATES PATENT AND TRADEMARK OFFICE
CERTIFICATE OF CORRECTION

| | |
|---|---|
| PATENT NO. | : 11,923,906 B2 |
| APPLICATION NO. | : 17/814415 |
| DATED | : March 5, 2024 |
| INVENTOR(S) | : Jock T. Bovington et al. |

It is certified that error appears in the above-identified patent and that said Letters Patent is hereby corrected as shown below:

In the Specification

In Column 2, Line 27, delete "afirst" and insert -- a first --.

In the Claims

In Column 20, Line 53, in Claim 20, delete "arranged" and insert -- arranged to --.

Signed and Sealed this
Thirteenth Day of August, 2024

Katherine Kelly Vidal
*Director of the United States Patent and Trademark Office*